H. STECKLER, Jr.
Corn-Planter.

No. 204,390.  Patented May 28, 1878.

Witnesses:

Inventor:
Henry Steckler Jr.
Per C. H. Watson & Co. Attorneys

UNITED STATES PATENT OFFICE.

HENRY STECKLER, JR., OF NEW IBERIA, LOUISIANA, ASSIGNOR TO HIMSELF AND RICHARD FROTSCHER, OF SAME PLACE.

IMPROVEMENT IN CORN-PLANTERS.

Specification forming part of Letters Patent No. 204,390, dated May 28, 1878; application filed April 2, 1878.

*To all whom it may concern:*

Be it known that I, HENRY STECKLER, Jr., of New Iberia, in the parish of Iberia and State of Louisiana, have invented certain new and useful Improvements in Corn-Planters; and I do hereby declare that the following is a full, clear, and exact description thereof, which will enable others skilled in the art to which it appertains to make and use the same, reference being had to the accompanying drawing, and to the letters of reference marked thereon, which form a part of this specification.

My invention relates to corn-planters; and it consists in the construction and arrangement of the corn-box and dropping devices, as will be hereinafter more fully set forth.

Figure 1:
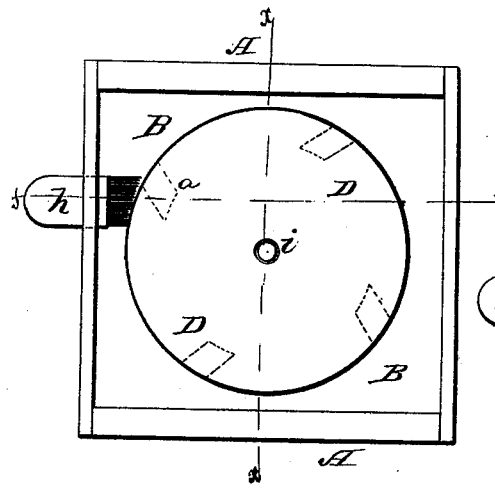
Figure 2:
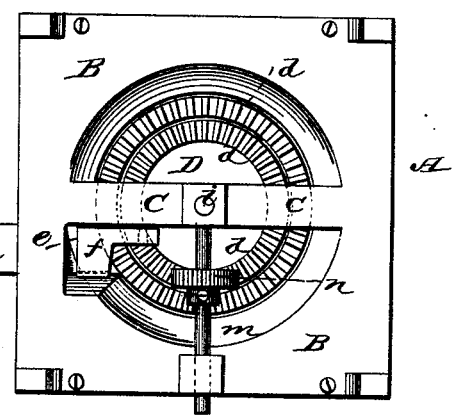
Figure 3:
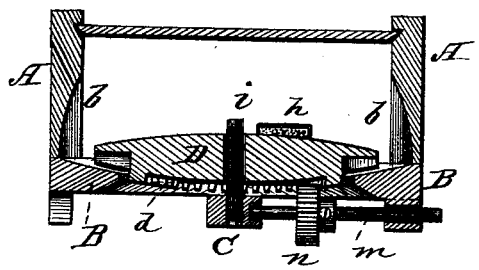
Figure 4:
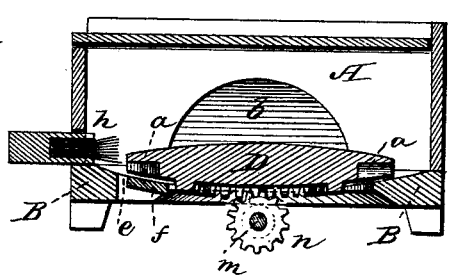
Figure 5:
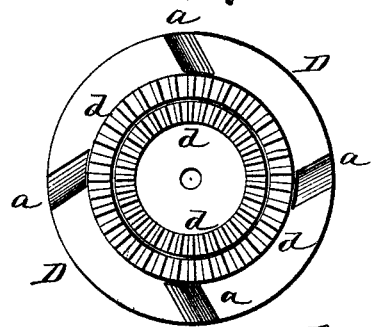

In the annexed drawing, Figure 1 is a plan view of my invention. Fig. 2 is a bottom view thereof. Figs. 3 and 4 are vertical sections through the lines $x\ x$ and $y\ y$, respectively, of Fig. 1. Fig. 5 is a bottom view of the dropping-wheel, and Fig. 6 is a detailed view of part of the same.

A represents the box, to which the main frame B is secured. This frame is cast in one piece, concave on its upper side, and with a central circular opening, across which is a bar, C, as shown.

The frame B, being concave, causes the seed to work toward the dropping-wheel D, which is convex on both the upper and lower sides, and has holes $a$ underneath for the entrance of the seed fed from the side through recesses $b\ b$ made in two opposite sides of the box A.

Figure 6:

The dropping-holes in the under side of the wheel D are made as shown in Fig. 6—that is to say, on an incline—and the top curved in arch form.

The wheel D is also cast with two sets of cogs, $d\ d$, arranged in two concentric circles, and all cast in one piece.

The upper side of the dropping-wheel is also convex, to cause the grain to work toward its periphery.

The main frame is cut out, so as to admit of the working of the gear already described; and at one side of the frame is the delivery-opening $e$, through which the grain drops, and said opening is provided with a slide, $f$, for the purpose of regulating the amount of seed to be sown, or cutting off the flow altogether.

The surplus grain will always lie back. No more will drop than what is exposed to the lower opening. The convex in the lower frame will always cause it to go toward the center. The construction of the holes or cells $a$ also causes it to lie back; but as there is no weight on them they will not crowd.

$h$ is the brush opposite the main delivery-opening $e$, which can be made by anybody in any suitable manner to answer the purpose for which it is intended.

In the center of the cross-bar C is a vertical pin or bolt, $i$, on which the dropping-wheel D is placed and revolves.

On the under side of the bar C is formed the inner bearing for a shaft, $m$, the outer bearing for which is formed on the under side of the frame B. The shaft $m$ carries a pinion, $n$, to take into the gears $d$ on the wheel D, said pinion being adjustable, so as to be made to mesh with either set of cogs, and fastened in either position by a set-screw.

By changing the pinion from one gear to the other, the distances between the hills are changed at pleasure.

Having thus fully described my invention, what I claim as new, and desire to secure by Letters Patent, is—

1. The box A, having the recesses $b$, in combination with the dropping-wheel D, being made convex on both sides, substantially as and for the purpose set forth.

2. The dropping-wheel D, made convex on both sides, and cast with two concentric circles of cogs, $d$, and seed-openings $a$ in its under side, in combination with the frame B and box A, having interior recesses $b$, substantially as and for the purposes herein set forth.

In testimony that I claim the foregoing as my own I have hereto affixed my signature in presence of two witnesses.

HENRY STECKLER, JR.

Witnesses:
ALPHONSE BREAUEX,
STEYNE JUDICE.